United States Patent
Kanode et al.

(10) Patent No.: US 9,106,769 B2
(45) Date of Patent: Aug. 11, 2015

(54) METHODS, SYSTEMS, AND COMPUTER READABLE MEDIA FOR CONGESTION MANAGEMENT IN A DIAMETER SIGNALING NETWORK

(75) Inventors: Mark Edward Kanode, Apex, NC (US); Seetharaman Khadri, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 140 days.

(21) Appl. No.: 13/572,156

(22) Filed: Aug. 10, 2012

(65) Prior Publication Data

US 2013/0039176 A1   Feb. 14, 2013

Related U.S. Application Data

(60) Provisional application No. 61/522,224, filed on Aug. 10, 2011.

(51) Int. Cl.
*H04L 12/26* (2006.01)
*G06F 11/00* (2006.01)
(Continued)

(52) U.S. Cl.
CPC ........... *H04M 15/8027* (2013.01); *H04L 43/16* (2013.01); *H04L 47/19* (2013.01); *H04L 12/1403* (2013.01); *H04L 41/5074* (2013.01); *H04L 63/0892* (2013.01)

(58) Field of Classification Search
CPC ....................... H04M 15/8027; H04L 41/5074
USPC .......................................................... 370/230
See application file for complete search history.

(56) References Cited

U.S. PATENT DOCUMENTS 6,144,636 A   11/2000  Aimoto et al.
7,072,651 B2   7/2006  Jiang et al.
(Continued)

FOREIGN PATENT DOCUMENTS

EP   0 857 399 B1   5/2004
EP   1 988 680 A1   11/2008
(Continued)

OTHER PUBLICATIONS

Commonly-assigned, co-pending U.S. Appl. No. 13/572,132 for "Methods, Systems, and Computer Readable Media for Policy Event Record Generation," (Unpublished, filed Aug. 10, 2012).
Calhoun et al., "Diameter Base Protocol," RFC 3588, pp. 1-147 (Sep. 2003).
Non-Final Office Action for U.S. Appl. No. 13/572,132 (Aug. 11, 2014).
Final Office Action for U.S. Appl. No. 13/040,020 (Sep. 19, 2014).
(Continued)

*Primary Examiner* — Guang Li
*Assistant Examiner* — Joe Combs
(74) *Attorney, Agent, or Firm* — Jenkins, Wilson, Taylor & Hunt, P.A.

(57) ABSTRACT

According to one aspect, the subject matter described herein includes a method for congestion management in a Diameter signaling network. The method occurs a Diameter routing node. The method includes determining, using a metric associated with Diameter message processing, that a first Diameter message processing metric threshold has been exceeded. The method also includes in response to determining that the first Diameter message processing metric threshold has been exceeded, performing a first congestion mitigation action, where performing the first congestion mitigation action includes analyzing subsequent Diameter messages to determine one or more common attributes of the subsequent Diameter messages and in response to determining the one or more common attributes of the subsequent Diameter messages, performing a second congestion mitigation action for Diameter messages having the one or more common attributes.

17 Claims, 7 Drawing Sheets

(51) Int. Cl.
*H04M 15/00* (2006.01)
*H04L 12/801* (2013.01)
*H04L 12/24* (2006.01)
*H04L 12/14* (2006.01)
*H04L 29/06* (2006.01)

(56) References Cited

U.S. PATENT DOCUMENTS

| | | |
|---|---|---|
| 8,305,922 B2 | 11/2012 | Cuervo |
| 8,326,263 B2 | 12/2012 | Zhou et al. |
| 8,331,229 B1 | 12/2012 | Hu et al. |
| 8,335,220 B2 | 12/2012 | Hu et al. |
| 8,353,000 B2 | 1/2013 | He et al. |
| 8,400,916 B2 | 3/2013 | Cutler et al. |
| 8,406,137 B2 | 3/2013 | Siddam et al. |
| 8,438,290 B2 | 5/2013 | Rui et al. |
| 8,543,118 B1 | 9/2013 | Mangal et al. |
| 8,577,329 B2 | 11/2013 | Momtahan et al. |
| 8,601,073 B2 | 12/2013 | Craig et al. |
| 8,605,583 B2 | 12/2013 | Cutler et al. |
| 8,626,156 B2 | 1/2014 | Marsico |
| 8,630,925 B2 | 1/2014 | Bystrom et al. |
| 8,675,487 B2 | 3/2014 | Siddam et al. |
| 8,681,622 B2 | 3/2014 | Chatterjee et al. |
| 8,683,544 B2 | 3/2014 | Foottit et al. |
| 8,787,174 B2 | 7/2014 | Riley et al. |
| 8,812,020 B2 | 8/2014 | Marsico |
| 8,818,327 B2 | 8/2014 | Shaikh |
| 2003/0003928 A1 | 1/2003 | Marjelund et al. |
| 2003/0200277 A1 | 10/2003 | Kim |
| 2004/0116117 A1 | 6/2004 | Ahvonen et al. |
| 2005/0105464 A1 | 5/2005 | Acharya et al. |
| 2005/0107091 A1 | 5/2005 | Vannithamby et al. |
| 2005/0176438 A1 | 8/2005 | Li |
| 2005/0195743 A1 | 9/2005 | Rochberger et al. |
| 2006/0069776 A1 | 3/2006 | Shim et al. |
| 2006/0090004 A1 | 4/2006 | Nikolayev et al. |
| 2006/0268835 A1 | 11/2006 | Hyotylainen et al. |
| 2007/0054665 A1 | 3/2007 | Elkarat et al. |
| 2007/0083927 A1 | 4/2007 | Swaroop |
| 2007/0121596 A1 | 5/2007 | Kurapati et al. |
| 2007/0153995 A1* | 7/2007 | Fang et al. ............... 379/114.03 |
| 2007/0195788 A1 | 8/2007 | Vasamsetti et al. |
| 2007/0232301 A1 | 10/2007 | Kueh |
| 2008/0031258 A1 | 2/2008 | Acharya et al. |
| 2008/0043689 A1 | 2/2008 | Walter |
| 2008/0142599 A1 | 6/2008 | Benillouche et al. |
| 2008/0170497 A1 | 7/2008 | Jeong et al. |
| 2008/0198748 A1 | 8/2008 | Gilfix et al. |
| 2008/0250156 A1 | 10/2008 | Agarwal et al. |
| 2008/0253387 A1 | 10/2008 | Liang et al. |
| 2009/0061855 A1 | 3/2009 | Sethi et al. |
| 2009/0092131 A1 | 4/2009 | Hu et al. |
| 2009/0109845 A1 | 4/2009 | Andreasen et al. |
| 2009/0185494 A1* | 7/2009 | Li et al. ..................... 370/241 |
| 2009/0207730 A1 | 8/2009 | Stamoulis et al. |
| 2009/0219946 A1 | 9/2009 | Liu et al. |
| 2009/0225762 A1 | 9/2009 | Davidson et al. |
| 2009/0228956 A1 | 9/2009 | He et al. |
| 2009/0270099 A1 | 10/2009 | Gallagher et al. |
| 2009/0325574 A1 | 12/2009 | Izawa et al. |
| 2010/0048161 A1 | 2/2010 | He et al. |
| 2010/0080171 A1 | 4/2010 | Rune et al. |
| 2010/0121960 A1 | 5/2010 | Baniel et al. |
| 2010/0190497 A1 | 7/2010 | Pudney et al. |
| 2010/0192170 A1 | 7/2010 | Raleigh |
| 2010/0211956 A1 | 8/2010 | Gopisetty et al. |
| 2010/0241496 A1 | 9/2010 | Gupta et al. |
| 2010/0246500 A1 | 9/2010 | Rydnell et al. |
| 2010/0287121 A1 | 11/2010 | Li et al. |
| 2010/0291924 A1 | 11/2010 | Antrim et al. |
| 2010/0297985 A1 | 11/2010 | Van Erlach |
| 2010/0299451 A1* | 11/2010 | Yigang et al. ............... 709/241 |
| 2011/0035495 A1 | 2/2011 | Ekström et al. |
| 2011/0040845 A1 | 2/2011 | Cai et al. |
| 2011/0061061 A1 | 3/2011 | Chen et al. |
| 2011/0067085 A1 | 3/2011 | Brouard et al. |
| 2011/0076985 A1 | 3/2011 | Chami et al. |
| 2011/0103261 A1 | 5/2011 | Duan |
| 2011/0116382 A1 | 5/2011 | McCann et al. |
| 2011/0122886 A1 | 5/2011 | Willars et al. |
| 2011/0138066 A1 | 6/2011 | Kopplin et al. |
| 2011/0165901 A1 | 7/2011 | Baniel et al. |
| 2011/0171958 A1* | 7/2011 | Hua et al. ................... 455/435.2 |
| 2011/0188457 A1 | 8/2011 | Shu et al. |
| 2011/0199903 A1 | 8/2011 | Cuervo |
| 2011/0217979 A1 | 9/2011 | Nas |
| 2011/0225306 A1 | 9/2011 | Delsesto et al. |
| 2011/0299395 A1* | 12/2011 | Mariblanca Nieves ....... 370/235 |
| 2011/0307790 A1 | 12/2011 | Pandya et al. |
| 2011/0317557 A1 | 12/2011 | Siddam et al. |
| 2012/0014332 A1 | 1/2012 | Smith et al. |
| 2012/0028626 A1 | 2/2012 | Marocchi et al. |
| 2012/0039175 A1 | 2/2012 | Sridhar et al. |
| 2012/0044867 A1* | 2/2012 | Faccin et al. ................ 370/328 |
| 2012/0052866 A1 | 3/2012 | Froehlich et al. |
| 2012/0087368 A1* | 4/2012 | Kunarathnam et al. ....... 370/389 |
| 2012/0099529 A1 | 4/2012 | Williams |
| 2012/0099715 A1 | 4/2012 | Ravishankar et al. |
| 2012/0115478 A1 | 5/2012 | Gunaratnam et al. |
| 2012/0131165 A1* | 5/2012 | Baniel et al. ................ 709/223 |
| 2012/0140632 A1 | 6/2012 | Norp et al. |
| 2012/0155389 A1* | 6/2012 | McNamee et al. ............ 370/328 |
| 2012/0176894 A1 | 7/2012 | Cai et al. |
| 2012/0203781 A1* | 8/2012 | Wakefield ..................... 707/736 |
| 2012/0213072 A1 | 8/2012 | Kotecha et al. |
| 2012/0221445 A1* | 8/2012 | Sharma ........................ 705/30 |
| 2012/0221693 A1* | 8/2012 | Cutler et al. ................ 709/223 |
| 2012/0250573 A1 | 10/2012 | Kulasingam et al. |
| 2012/0250613 A1 | 10/2012 | Robinson et al. |
| 2012/0303796 A1* | 11/2012 | Mo et al. ..................... 709/224 |
| 2013/0041994 A1 | 2/2013 | Terrien et al. |
| 2013/0079006 A1 | 3/2013 | Cho et al. |
| 2013/0114404 A1 | 5/2013 | Yang |
| 2013/0160058 A1 | 6/2013 | Albal et al. |
| 2013/0163429 A1* | 6/2013 | Dunstan et al. ............... 370/235 |
| 2013/0177146 A1 | 7/2013 | Schneider et al. |
| 2013/0265911 A1 | 10/2013 | Kulaingam et al. |
| 2013/0275583 A1 | 10/2013 | Roach et al. |
| 2014/0018067 A1 | 1/2014 | Rajagopalan et al. |
| 2014/0022897 A1 | 1/2014 | Rajagopalan et al. |
| 2014/0031029 A1 | 1/2014 | Rajagopalan et al. |
| 2014/0040975 A1 | 2/2014 | Raleigh et al. |
| 2014/0376380 A1 | 12/2014 | Campbell et al. |
| 2015/0011182 A1 | 1/2015 | Goldner et al. |
| 2015/0036486 A1 | 2/2015 | McMurry et al. |
| 2015/0036504 A1 | 2/2015 | McMurry et al. |
| 2015/0036505 A1 | 2/2015 | Sparks et al. |

FOREIGN PATENT DOCUMENTS

| | | |
|---|---|---|
| EP | 2 093 931 A1 | 8/2009 |
| JP | 2006-100873 | 4/2006 |
| KR | 10-2009-0029348 | 3/2009 |
| WO | WO 2009/058067 A1 | 5/2009 |
| WO | WO 2009/070179 A1 | 6/2009 |
| WO | WO 2009/129487 A2 | 10/2009 |
| WO | WO 2009/149341 A2 | 12/2009 |
| WO | WO 2011/082035 | 7/2011 |
| WO | WO 2011/161575 A1 | 12/2011 |
| WO | WO 2012/130264 A1 | 10/2012 |
| WO | WO 2013/155535 A1 | 10/2013 |
| WO | WO 2014/014829 A1 | 1/2014 |
| WO | WO 2014/015331 A1 | 1/2014 |
| WO | WO 2015/017422 A1 | 2/2015 |

OTHER PUBLICATIONS

First Office Action for Chinese Application No. 201080064945.X (Sep. 17, 2014).
Communication of extended European Search Report for European Patent Application No. 10841576.1 (May 9, 2014).
Non-Final Office Action for U.S. Appl. No. 13/040,020 (Apr. 21, 2014).

(56) References Cited

OTHER PUBLICATIONS

Applicant-Initiated Interview Summary for U.S. Appl. No. 13/040,020 (Mar. 20, 2014).
Notice of Allowance and Fee(s) Due for U.S. Appl. No. 12/973,228 (Mar. 20, 2014).
Notice of Allowance and Fee(s) Due for U.S. Appl. No. 13/251,784 (Feb. 12, 2014).
Final Office Action for U.S. Appl. No. 13/040,020 (Dec. 13, 2013).
Notification of Transmittal of the International Search Report and the Written Opinion of the International Searching Authority, or the Declaration for International Application No. PCT/US2013/050512 (Dec. 2, 2013).
Notice of Allowance and Fee(s) Due for U.S. Appl. No. 13/330,086 (Nov. 6, 2013).
Notification of Transmittal of the International Search Report and the Written Opinion of the International Searching Authority, or the Declaration for International Application No. PCT/US2013/051447 (Oct. 28, 2013).
Non-Final Office Action for U.S. Appl. No. 12/973,228 (Oct. 25, 2013).
Non-Final Office Action for U.S. Appl. No. 13/251,784 (Oct. 10, 2013).
Advisory Action for U.S. Appl. No. 13/251,784 (Sep. 6, 2013).
Notice of Allowance and Fee(s) Due for U.S. Appl. No. 13/276,916 (Sep. 3, 2013).
Non-Final Office Action for U.S. Appl. No. 13/040,020 (Jul. 18, 2013).
Final Office Action for U.S. Appl. No. 13/251,784 (Jun. 26, 2013).
Final Office Action for U.S. Appl. No. 12/973,228 (Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (Apr. 11, 2013).
Non-Final Office Action for U.S. Appl. No. 12/973,228 (Feb. 1, 2013).
Non-Final Office Action for U.S. Appl. No. 13/251,784 (Dec. 19, 2012).
Communication of European Publication Number and Information on the Application of Article 67(3) EPC for European Patent Application No. 10841576.1 (Oct. 10, 2012).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Notification of Transmittal of the International Search Report and the Written Opinion of the International Searching Authority, or the Declaration for International Patent Application No. PCT/US2010/061586 (Sep. 26, 2011).
3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V94.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE+ePC=EPS), IMS, PCC and SDM," Effort, pp. 1-229 (Part 1 of 2) (May 2010).
Znaty, "Diameter, GPRS, (LTE+ePC=EPS), IMS, PCC and SDM," EFORT pp. 230-461 (Part 2 of 2) (May 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
International Standard, "Maritime Navigation and Radiocommunication Equipment and Systems—Digital Interfaces—Part 1: Single Talker and Multiple Listeners," IEC 61162-1, Second edition, pp. 1-86 (Jul. 2000).
Communication of European publication number and information on the application of Article 67(3) EPC for European Application No. 13776083.1 (Jan. 21, 2015).
Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).
Notification of Transmittal of the International Search Report and the Written Opinion for of the International Searching Authority, or the Declaration for International Application No. PCT/US2014/048651 (Nov. 17, 2014).
Notification of Transmittal of the International Search Report and the Written Opinion of the International Searching Authority, or the Declaration for International Application No. PCT/US2014/048644 (Oct. 17, 2014).
Commonly-assigned, co-pending International Application No. PCT/US14/48651 for "Methods, Systems, and Computer Readable Media for Diameter Load and Overload Information and Virtualization," (Unpublished, filed Jul. 29, 2014).
Commonly-assigned, co-pending U.S. Appl. No. 14/034,478 for "Methods, Systems, and Computer Readable Media for Diameter Load and Overload Information and Virtualization," (Unpublished, filed Sep. 23, 2013).
Tschofenig, "Diameter Overload Architecture and Information Model," draft-tschofenig-dime-overload-arch-00.txt, DIME, pp. 1-9 (Jul. 16, 2013).
Notification of Transmittal of the International Search Report and the Written Opinion of the International Searching Authority, or the Declaration for International Application No. PCT/US2013/036664 (Jul. 2, 2013).

(56) References Cited

OTHER PUBLICATIONS

Campbell, "Diameter Overload Control Solution Issues," draft-campbell-dime-overload-issues-00, pp. 1-16 (Jun. 2013).
"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).
Roach et al., "A Mechanism for Diameter Overload Control," draft-roach-dime-overload-ctrl-03, DIME, pp. 1-49 (May 17, 2013).
Korhonen et al., "The Diameter Overload Control Application (DOCA)," draft-korhonen-dime-ovl-01.txt, Diameter Maintenance and Extensions (DIME), pp. 1-18 (Feb. 25, 2013).
Fajardo et al., "Diameter Base Protocol," RFC 6733, pp. 1-152 (Oct. 2012).
McMurry et al., "Diameter Overload Control Requirements," draft-ietf-dime-overload-reqs-00, pp. 1-25 (Sep. 21, 2012).
"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).
Interview Summary for U.S. Appl. No. 12/425,998 (Sep. 14, 2011).
Final Office Action for U.S. Appl. No. 12/425,998 (Jun. 8, 2011).
Interview Summary for U.S. Appl. No. 12/425,998 (Mar. 1, 2011).
Non-Final Office Action for U.S. Appl. No. 12/425,998 (Nov. 29, 2010).
Notification of Transmittal of the International Search Report and the Written Opinion of the International Searching Authority, or the Declaration for International Application No. PCT/US2009/041006 (Dec. 4, 2009).
Hilt et al., "Session Initiation Protocol (SIP) Overload Control," IETF, draft-hilt-sipping-overload-02, p. 1-28 (Jul. 8, 2007).
Zhang et al., "Denial of Service Attack and Prevention on SIP VoIP Infrastructures Using DNS Flooding," in Principles, Systems, and Applications of IP Telecummunications (IPTCOMM) (Jul. 2007).
Nahum et al., "Evaluating SIP Server Performance," IBM T.J. Watson Research Center, RC24183 (Feb. 2007).
Rosenberg, "Requirements for Management of Overload in the Session Initiation Protocol," IETF, draft-rosenbergy-sipping-overload-reqs-02, p. 1-22 (Oct. 2006).
Kuthan et al., "Denial of Service Attacks Targeting a SIP VoIP Infrastructure: Attack Scenarios and Prevention mechanisms," IEEE Networks Magazine, vol. 20, No. 5 (Sep. 2006).
Ohta, "Overload Protection in a SIP Signaling Network," in International conference on Internet Surveillance and Protection (ICISP), p. 1-6 (2006).
Donovan et al., "Session Timers in the Session Initiation Protocol (SIP)," Network Working Group, RFC 4028 (Apr. 2005).
Ohta, "Simulation Study of SIP Signaling in an Overload Condition," International Conference for Communications, Internet, and Information Technology, IASTED/ACTA Press, pp. 321-326 (Nov. 22-24, 2004).
Rosenberg et al., "SIP: Session Initiation Protocol," Network Working Group, RFC 3261, http://www.ietf.org/rfc/rfc3261.txt, p. 1-252 (Jun. 2002).
Schulzrinne et al., "SIPstone—Benchmarking SIP Server Performance," (Apr. 2002).
"Signaling Flows for the IP Multimedia Call control Based on Session Initiation Protocol (SIP) and Session Description Protocol (SDP)," 3GPP TS 24.228 V1.1.0, p. 1-653 (Jul. 3-6, 2001).
Grossglauser et al., "On the Relevance of Long-Range Dependence in Network Traffic," IEEE/ACM Transactions on Networking, vol. 7, No. 5, p. 629-640 (Oct. 1999).
Final Office Action for U.S. Appl. No. 13/572,132 (Mar. 11, 2015).
Non-Final Office Action for U.S. Appl. No. 13/942,323 (Feb. 25, 2015).
Non-Final Office Action for U.S. Appl. No. 13/040,020 (Jan. 29, 2015).
Non-Final Office Action for U.S. Appl. No. 13/947,314 (Jan. 16, 2015).
Advisory Action and Examiner-Initiated Interview Summary for U.S. Appl. No. 13/040,020 (Dec. 5, 2014).

* cited by examiner

| Origination Host | Origination Realm | Destination Host | Destination Realm | Appl ID | Ingress / Egress | Msg-Per-Sec Threshold | Post-Threshold Action |
|---|---|---|---|---|---|---|---|
| MMEC5.MMEGI1.MME.EPC.MNC01.MCC208.3GPPNETWORK.ORG | EPC.MNC01.MCC208.3GPPNETWORK.ORG | HSS1.EPC.MNC01.MCC208.3GPPNETWORK.ORG | EPC.MNC01.MCC208.3GPPNETWORK.ORG | 16777251 | INGRESS | 500 | APPLY MEDIATION RULE X |
| MMEC6.MMEGI1.MME.EPC.MNC01.MCC208.3GPPNETWORK.ORG | EPC.MNC01.MCC208.3GPPNETWORK.ORG | HSS2.EPC.MNC01.MCC208.3GPPNETWORK.ORG | EPC.MNC01.MCC208.3GPPNETWORK.ORG | 16777251 | EGRESS | 800 | APPLY MEDIATION RULE Y |

— 400

| Post-Threshold Mediation Rule | Description | Parameter ID | Parameter Value | Action |
|---|---|---|---|---|
| X | PARAMETER SPECIFIC DISCRIMINATION RULE | RPET FLAGS | 11010000 | DISCARD REQUEST MSG, GENERATE ASSOCIATED ANSWER MSG AND SEND TO REQUEST ORIGINATOR |
| Y | APPLY TRAFFIC PROFILING RULE | APPLICATION ID | N/A | BUILD & REPORT 30 SECOND APPLICATION ID SPECIFIC TRAFFIC PROFILE |
| Z | APPLY ALTERNATE ROUTING | RPET FLAGS | 11010000 | ROUTE DIAMETER MESSAGES USING ALTERNATE ROUTES (E.G., HIGHER COST ROUTES, BACKUP ROUTES, ETC.) |

METHODS, SYSTEMS, AND COMPUTER READABLE MEDIA FOR CONGESTION MANAGEMENT IN A DIAMETER SIGNALING NETWORK

PRIORITY CLAIM

This application claims the benefit of U.S. Provisional Patent Application Ser. No. 61/522,224, filed Aug. 10, 2011, the disclosure of which is incorporated herein by reference in its entirety.

TECHNICAL FIELD

The subject matter described herein relates to methods and systems for monitoring signaling messages. More particularly, the subject matter described herein relates to methods, systems, and computer readable media for congestion management in a Diameter signaling network.

BACKGROUND

Diameter is an authentication, authorization and accounting (AAA) protocol for computer networks, and is a successor to Radius. The Diameter base protocol is defined in International Engineering Task Force (IETF) request for comments (RFC) 3588 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be exchanged between Diameter nodes for performing various functions. For example, a mobility management entity (MME) and a home subscriber server (HSS) may interact for authentication, authorization, and/or accounting (AAA) purposes. While RFC 3588 discloses various aspects involving Diameter, performing congestion management of Diameter signaling messages is not adequately addressed.

Accordingly, there exists a need for methods, systems, and computer readable media for congestion management in a Diameter signaling network.

SUMMARY

According to one aspect, the subject matter described herein includes a method for congestion management in a Diameter signaling network. The method occurs a Diameter routing node. The method includes determining, using a metric associated with Diameter message processing, that a first Diameter message processing metric threshold has been exceeded. The method also includes in response to determining that the first Diameter message processing metric threshold has been exceeded, performing a first congestion mitigation action. Performing the first congestion mitigation action includes analyzing subsequent Diameter messages to determine one or more common attributes of the subsequent Diameter messages and in response to determining the one or more common attributes of the subsequent Diameter messages, performing a second congestion mitigation action for Diameter messages having the one or more common attributes.

According to another aspect, the subject matter described herein includes a system for congestion management in a Diameter signaling network. The system includes a Diameter routing node. The Diameter routing node includes a screening module configured to determine, using a metric associated with Diameter message processing, that a first Diameter message processing metric threshold has been exceeded. The Diameter routing node also includes a congestion management module configured to perform a first congestion mitigation action in response to determining that the first Diameter message processing metric threshold has been exceeded. Performing the first congestion mitigation action includes analyzing subsequent Diameter messages to determine one or more common attributes of the subsequent Diameter messages and in response to determining the one or more common attributes of the subsequent Diameter messages, performing a second congestion mitigation action for Diameter messages having the one or more common attributes.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which:

FIG. 4 is a diagram illustrating exemplary routing and congestion management data according to an embodiment of the subject matter described herein;

DETAILED DESCRIPTION

In accordance with the subject matter disclosed herein, systems, methods, and computer readable media are provided for performing congestion management in Diameter signaling network. Advantageously, the present subject matter described herein can prevent overloading of nodes in the Diameter signaling network by using a congestion management module. For example, a Diameter routing node may receive, process, and route a significant amount of Diameter messages. By providing a Diameter routing node that performs congestion management based on dynamic and/or user-customizable rules, performance of the Diameter routing node and Diameter Peer nodes connected to the Diameter routing node may be maintained. For example, the Diameter signaling node may be capable of throttling the volume of Diameter traffic sent to or received from peers based on the content of the traffic, network conditions, and/or other factors.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
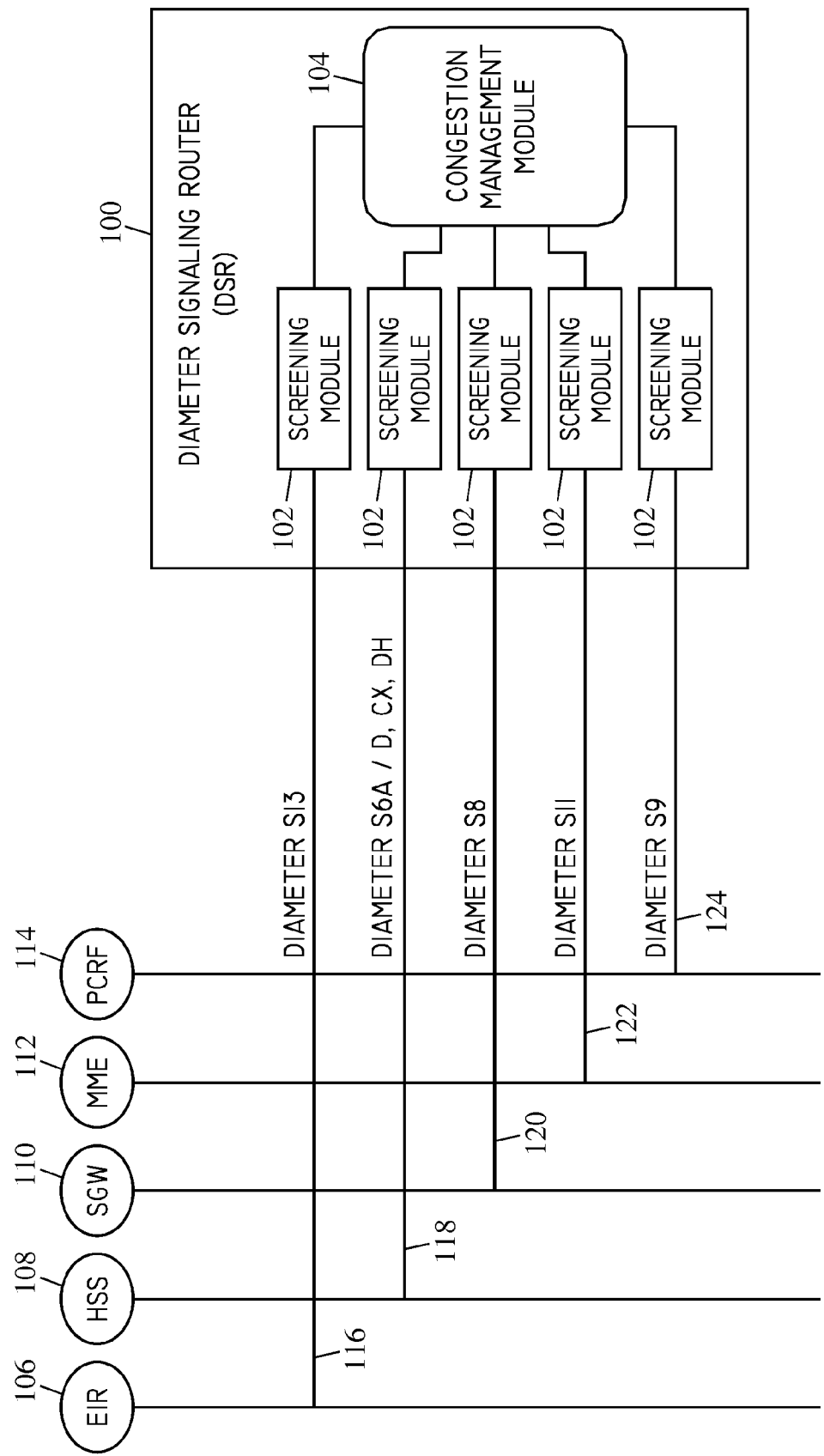
FIG. 1 is a diagram illustrating connectivity between various nodes and a Diameter signaling router via Diameter interfaces according to an embodiment of the subject matter described herein.

FIG. 1 is a diagram illustrating connectivity between various nodes and a Diameter signaling router (DSR) 100 via Diameter interfaces according to an embodiment of the subject matter described herein. In the embodiment illustrated in FIG. 1, various Diameter nodes, including DSR 100, are depicted. Diameter nodes may be nodes capable of implementing or using a Diameter protocol. For example, Diameter nodes may include DSR 100, a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a charging data function (CDF), an online charging system, an offline charging system, a policy charging enforcement function (PCEF), a policy charging and rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, a Diameter message processor, a data collection platform, a multi-protocol signaling gateway, a multi-protocol signaling router, or a computing platform. Examples of DSR 100 include, but are not limited to, a Diameter routing node, a Diameter routing agent, a Diameter relay agent, a Diameter redirect agent, a Diameter translation agent, a Diameter proxy agent.

Referring to FIG. 1, DSR 100 may include functionality for processing and/or routing various messages and may include various communications interfaces for communication with Diameter nodes, e.g., 3rd Generation Partnership Project (3GPP) LTE communications interfaces and other (e.g., non-LTE) communications interfaces. DSR 100 may include functionality for correlating and/or monitoring Diameter messages associated with one or more communications interfaces. In some embodiments, correlating and/or monitoring functionality may be included in one or more modules. For example, DSR 100 may include or have access to one or more screening modules 102 and one or more congestion management modules (CMMs) 104 for monitoring Diameter signaling messages and managing congestion associated with multiple different Diameter signaling interfaces, e.g., S9, S6a, Cx, and Dx.

Screening modules 102 may include functionality for processing (e.g., identifying and marking relevant messages) and/or copying messages. For example, Diameter messages traversing a node via an interface may be processed or screened by screening modules 102. In some embodiments, screening modules 102 may be adapted to screen signaling messages (e.g., Diameter messages) based on one or more screening rules and/or policies. If a signaling message matches a rule and/or policy, the signaling message, or portion thereof, may be copied, marked, and/or flagged. The copied, marked, and/or flagged message may be sent to other modules (e.g., CMM 104) and/or nodes for further processing.

Screening modules 102 may be used in performing congestion management in a Diameter signaling network. For example, each screening module 102 may be configured to monitor one or more metrics associated with Diameter processing. Screening modules 102 may mark Diameter messages (e.g., by setting one or more flags and/or by adding or modifying an attribute in the Diameter messages) that should receive or be affected by congestion management actions. Screening modules 102 may mark Diameter messages that should bypass or not be affected by congestion management actions.

Exemplary monitored metrics may include an ingress rate of Diameter signaling messages to DSR 100, an egress rate of Diameter signaling messages from DSR 100, a message processing queue depth associated with DSR 100, a processor utilization metric associated with DSR 100, a failed transaction volume metric associated with DSR 100, a rate of communication of Diameter messages, or a pending transaction volume metric. Screening modules may be aware of various metric thresholds that correspond to a monitored metric. For example, an ingress message per second (MPS) rate for Diameter request messages directed to DSR 100 could be monitored and a threshold for the metric may be 800 MPS. If a metric threshold is exceeded, screening module 102 may be configured to mark, identify, and/or initiate another module to perform a congestion mitigation action.

In some embodiments, monitored metrics and associated thresholds may include aggregate metrics associated with the entire DSR 100, a message processor, or a module within DSR 100. In some embodiments, monitored metrics and associated thresholds may be associated with a single Diameter communication interface, a single connection, single association, or a grouping of various interfaces, connections, or associations.

CMM 104 may include functionality for performing congestion management for a Diameter signaling network, including correlating messages and performing congestion mitigation actions, also referred to as congestion mediation actions. CMM 104 may perform one or more congestion mitigation actions in response to various metric thresholds being exceeded and/or a Diameter message being marked for congestion management. Exemplary congestion mitigation actions may include discarding a subsequently received message, generating a copy of a subsequently received message, generating a transaction detail record associated with a subsequently received message, preferentially routing or processing a Diameter message, performing traffic profiling, ceasing one or more congestion mitigation actions, or applying one or more additional congestion mitigation actions (e.g., in a recursive manner).

CMM 104 may include functionality for traffic profiling and/or correlation. Traffic profiling and/or correlation may include identifying (e.g., indexing, tagging, or associating) related Diameter messages and/or other signaling messages. For example, correlation processing may include correlating received Diameter messages that are associated with the same subscriber, session, and/or access node.

In some embodiments, Diameter traffic profiling may be performed as a congestion mitigation action. Diameter traffic profiling may indicate to a network operator or an analysis module additional congestion mitigation actions to perform and/or indicate which Diameter messages to apply congestion mitigation actions.

In some embodiments, Diameter traffic profiling may be applied to ingress Diameter message traffic, egress Diameter traffic, or all Diameter traffic. Traffic profiling statistics may be generated for a predetermined period of time, a predetermined number of Diameter messages, or based on another factor (e.g., until another threshold is exceeded).

After a Diameter traffic profile is generated, CMM 104 or another module may analyze the Diameter traffic profile. In some embodiments, the analysis seeks to identify attributes (e.g., attribute value pairs (AVPs)) that are common to some or all of the Diameter messages associated with the traffic profile. If common attributes are identified, CMM 104 may perform one or more congestion mitigation actions for zero or more (e.g., 50%) of all related Diameter messages (e.g., messages having the identified common attributes).

In some embodiments, a screening module 102 and a CMM 104 may be integrated at a single node or may each be located at distinct nodes. For example, a screening module 102 and a CMM 104 may be located at DSR 100. In another example, a screening module 102 may be located at DSR 100 and a CMM 104 may be located at a distinct computing platform. In yet example, a screening module 102 may be located at a link probe and a CMM 104 may be located at a distinct computing platform and/or node. In some embodiments, a screening module 102 and CMM 104 may be integrated into a single module or function. For example, CMM 104 may screen Diameter messages and manage congestion of a Diameter signaling network and may be located at numerous message processors of DSR 100.

In the embodiment illustrated in FIG. 1, DSR 100 may communicate with equipment identity register (EIR) 106 via a Diameter S13 interface 116. DSR 100 may also communicate with HSS 108 via a Diameter S6a interface, a Diameter S6d interface, a Diameter Cx interface, or a Diameter Dh interface (collectively referred to herein as an HSS interface 118). DSR 100 may communicate with serving gateway (SGW) 110 via a Diameter S8 interface 120. DSR 100 may communicate with MME 112 via an S11 interface 122. DSR 100 may communicate with PCRF 114 via a Diameter Gx, Rx, or S9 interface 124. DSR 100 may also interface with a packet gateway, such as a GGSN or PDN Gateway, via Gy, Gz, Ro, or Rf interfaces (not shown).

In some embodiments, each interface may be associated with a unique screening module 102. For example, at a DSR, a Dx interface may be associated with a Dx screening module 102. In other embodiments, interfaces may share or use one or more screening modules 102. For example, at a DSR, a message processor may include a screening module 102 for screening messages received from a plurality of interfaces.

In some embodiments, DSR 100 may receive Diameter messages via other Diameter interfaces. For example, DSR 100 may receive Diameter message via an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

While FIG. 1 depicts DSR 100 communicating with (e.g., receiving Diameter messages from) various Diameter nodes via particular Diameter interfaces, it will be appreciated that DSR 100 may communicate with the nodes depicted and other nodes via additional and/or different interfaces.

Figure 2:
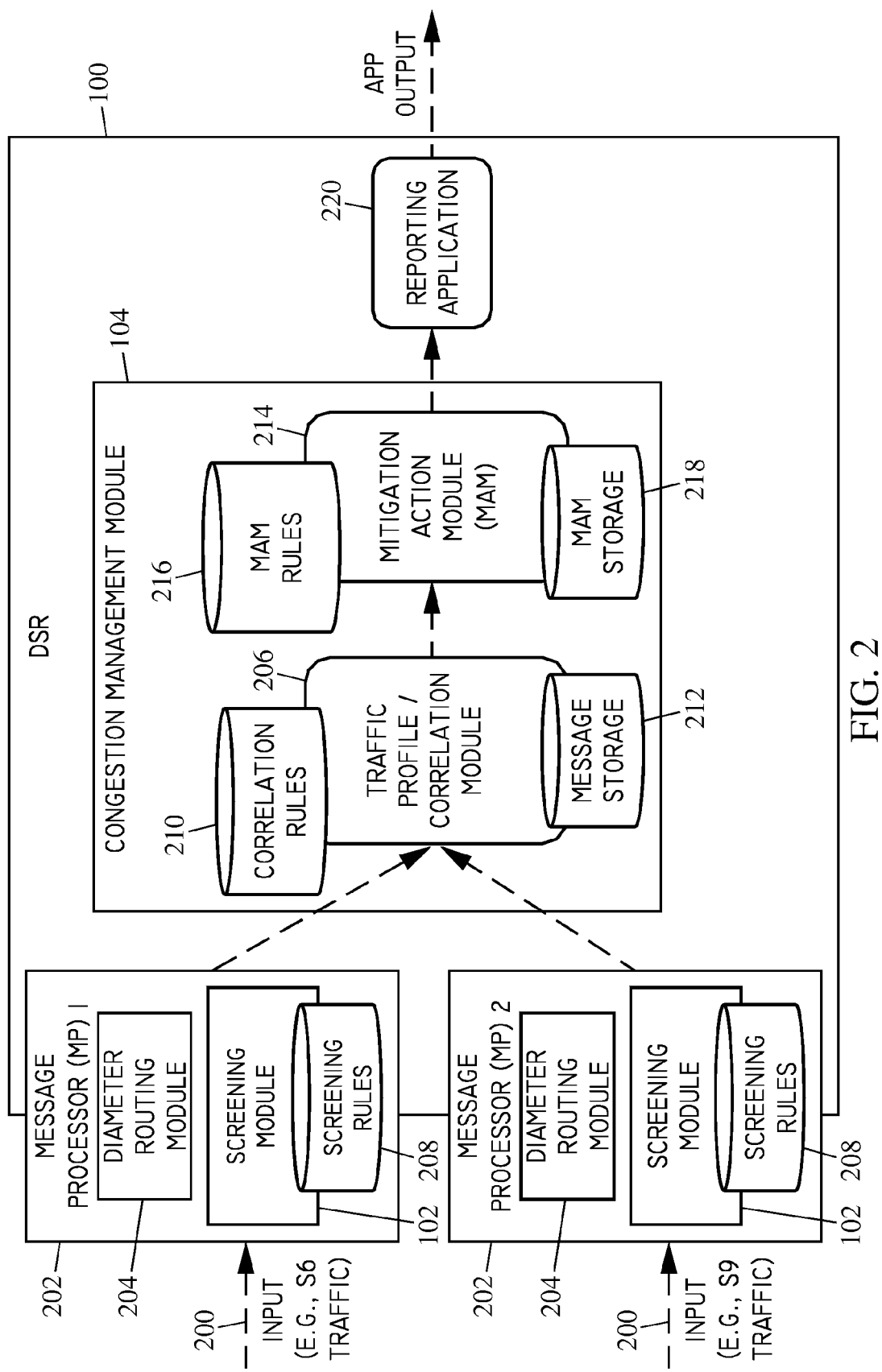
FIG. 2 is a diagram illustrating Diameter message congestion management according to an embodiment of the subject matter described herein.

FIG. 2 is a diagram illustrating Diameter message congestion management according to an embodiment of the subject matter described herein. In the embodiment illustrated in FIG. 2, DSR 100 may include various modules, components, and/or functionality for performing Diameter interface monitoring and/or functionality for performing congestion management. DSR 100 may include one or more message processors (MPs) 202 for receiving and/or processing Diameter messages. For example, an MP 202 may be adapted to receive and process Diameter messages that are associated with one or more Diameter interfaces, such as a Diameter S6a signaling interface. In another example, an MP 202 may be adapted to receive and process particular Diameter messages (e.g., UpdateLocation Request (ULR) messages and UpdateLocation Answer (ULA) messages) that are associated with any Diameter interface.

Each MP 202 may include functionality for receiving, copying, and/or processing Diameter messages. For example, as illustrated in FIG. 2, an MP 202 may include a Diameter routing module 204, a screening module 102, and screening rules storage 208. Diameter routing module 204 may include various rules, policies, and/or information for relaying or routing Diameter messages to an appropriate destination (e.g., a Diameter application or node). For example, after receiving, copying, and/or processing a Diameter message, Diameter routing module 204 may determine (e.g., using message header information and a route list) an appropriate destination for the Diameter message.

Screening modules 102 may include functionality for processing and/or copying signaling messages. In some embodiments, screening modules 102 may be adapted to screen Diameter messages based on one or more screening rules. Exemplary screening rules may be used to copy, correlate, and/or monitor Diameter messages, or portions thereof, based on various factors. For example, screening modules 102, using one or more screening rules, may copy messages, or portions thereof, that include a particular Visited-PLMN-ID value or a particular User-Name value. In another example, screening modules 102, using screening rules, may copy messages, or portions thereof, associated with a particular Diameter interface.

In some embodiments, screening rule criteria may include a message type (e.g., a ULR message command code and Location Information Request (LIR) message command code, Credit Control Request (CCR) message command code, Re-Authorization Request message command code, etc.), time of day, a network condition, a network operator, a subscriber tier, a subscriber, an associated interface, an origination node, an origination network, a destination node, a destination network, a particular AVP code, and/or AVP information (e.g., a Visited-PLMN-ID, SGSN-Number, and User-Name).

In some embodiments, screening rules may include thresholds and congestion mitigation actions. For example, screening modules 102 may include rules that indicate when certain Diameter messages (e.g., based on AVPs or other metrics) should be affected by congestion management rules and/or actions. For example, screening modules 102 may enforce a rule that if Diameter request messages are received at a rate greater than 500 MPS, all new Diameter request messages are given a lower routing priority than Diameter answer messages. As such, in-process Diameter transactions may be given preference (i.e., higher routing priority) during a congested time period.

Screening rules storage 208 may include any entity (e.g., a database or memory cache) for maintaining or storing screening rules. DSR 100, including components (e.g., MPs 202) and modules therein, may access screening rules storage 208 for obtaining screening rules and/or related information. In some embodiments, screening rules storage 208 may be integrated with one or more MPs 202. In some embodiments, screening rules storage 208 may be distinct from and/or external to MPs 202.

In some embodiments, screened messages (e.g., Diameter messages, or portions thereof, that traverse MPs 202 and/or copies of such Diameter messages or portions) may be sent from DSR 100 to an external application or node for reporting and/or further processing. For example, copies of screened messages may be provided (e.g., as raw message copy output) to a node that is external to DSR 100.

In some embodiments, screened messages may be sent to one or more modules located at or integrated with DSR 100. For example, screened messages may be sent to CMM 104. CMM 104 may include functionality for performing congestion management. In addition, CMM 104 may include functionality for correlating, storing, and/or generating information (e.g., records, statistics and/or reports) associated with various signaling messages (e.g., Diameter messages). CMM 104 may include various modules for performing one or more functions, such as a traffic profile and/or correlation module (TPCM) 206 and a mitigation action module (MAM) 214.

TPCM 206 may include functionality for performing traffic profiling and/or correlation. TPCM 206 may use TPCM rules to generate Diameter message processing statistics, e.g., Diameter messages that are throttled, Diameter messages that are marked for throttling, and Diameter messages that are marked so as to bypass throttling.

In some embodiments, a TPCM rule may be used to associate messages that are related to a subscriber or set of subscribers. In another example, a TPCM rule may be used to associate messages that relate to a particular node, application, interface, protocol, network operator, or service provider. TPCM 206 may store statistics and/or other traffic profiling information in message storage 212 or send the information to additional nodes or modules for further analysis.

Correlation rules storage 210 may include any entity (e.g., a database, cache, or other memory device) for maintaining or storing TPCM rules. DSR 100, including components and modules therein, may access correlation rules storage 210 for obtaining TPCM rules and/or related information. In some embodiments, correlation rules storage 210 may be integrated with DSR 100. In some embodiments, correlation rules storage 210 may be distinct from and/or external to DSR 100.

Message storage 212 may include any entity for maintaining or storing messages, or portions thereof, and/or traffic profiling information. DSR 100, including components and modules therein, may access message storage 212 for obtaining screened messages and/or related information. In some embodiments, message storage 212 may be integrated with DSR 100. In some embodiments, message storage 212 may be distinct from and/or external to DSR 100.

In some embodiments, after correlation is performed, TPCM information may be provided to additional modules and/or external nodes. For example, correlated message output may be sent to an external node for generating monitoring records, such as call detail records (CDRs) or transaction detail records (TDRs). In another example, messages may be sent to a MAM 214.

MAM 214 may include functionality for performing one or more congestion mitigation actions. In some embodiments, MAM 214 may receive an indication from TPCM 206 or screening module 102 regarding which messages are associated with congestion mitigation actions. For example, MAM 214 may receive an internal trigger message from TPCM 206 or may respond to a modified flag or AVP in a Diameter message. In response to determining that Diameter messages are associated with an exceeded threshold, congestion mitigation actions may be performed.

In some embodiments, MAM 214 may use MAM or peer route table (PRT) rules that indicate congestion mitigation actions to perform. For example, a MAM rule may indicate, if a threshold is exceeded for Diameter messages of certain types or that contain certain attributes, the Diameter messages should be discarded without sending corresponding Diameter answer messages to the messages' originators. In another example, a MAM rule may indicate that, if a threshold is exceeded for Diameter registration request messages, the Diameter registration request messages should be discarded and corresponding Diameter answer messages should be generated and sent to the messages' originators. In this example, the MAM rule may also indicate user configurable text, status, or error code for including in the generated Diameter answer messages.

MAM rules storage 216 may include any entity (e.g., a database, cache, or other memory device) for maintaining or storing MAM rules. DSR 100, including components and modules therein, may access MAM rules storage 216 for obtaining MAM rules and/or related information. In some embodiments, MAM rules storage 216 may be integrated with DSR 100. In some embodiments, MAM rules storage 216 may be distinct from and/or external to DSR 100.

MAM storage 218 may include any entity for maintaining or storing MAM records, or portions thereof. DSR 100, including components and modules therein, may access MAM storage 218 for determining congestion mitigation actions performed. In some embodiments, message storage 218 may be integrated with DSR 100. In some embodiments, message storage 218 may be distinct from and/or external to DSR 100.

In some embodiments, MAM 214 may provide a message or related congestion management information to another module or node. For example, MAM 214 may provide a non-throttled Diameter message to a routing module at an egress MP 202 or may provide congestion management information to reporting application 220.

Reporting application 220 may be any application or other entity for providing or generating information. For example, reporting application 220 may receive CDRs, messages, correlated message information or traffic profile information and may process this information. In some embodiments, reporting application 220 may include, but is not limited to, a billing application, a billing verification application, a quality of service (QoS) application, a trouble-ticket generating application, a network diagnostic application, a business intelligence application, a service level agreement compliance verification application, a pre-paid services application, a fraud detection application, a lawful surveillance application, or other application.

While FIG. 2 depicts various modules within DSR 100, it will be appreciated that DSR 100 may include fewer, additional, or different modules and/or components. Further, each module depicted in FIG. 2 may include fewer, additional, or different modules and/or components. For example, CMM 104 may be separate or distinct from TPCM 206. In another example, CMM 104 may include various applications, such as reporting application 220.

In the architecture described above with respect to FIG. 2, screening modules 102 associated with message processors 202 copy Diameter signaling messages and send the messages to TPCM 206 for correlation. In an alternate implementation, because Diameter is a hop-by-hop protocol, message processors 202 may maintain a pending transaction list for every Diameter request message that traverses a message processor. Upon receiving an answer message, message processors 202 may correlate the answer with a pending request using the transaction list.

In some embodiments, once the correlation is successfully completed, the answer message may be propagated back to the downstream peer that sent the message. Because Diameter routing implemented by message processors 202 may be required to perform message correlation, screening modules 102 may correlate messages and consolidate the correlated messages into a single message. The single message may be sent to additional modules. Because message correlation may be performed by the message processors, correlation on CMM 104 may be omitted.

Figure 3:
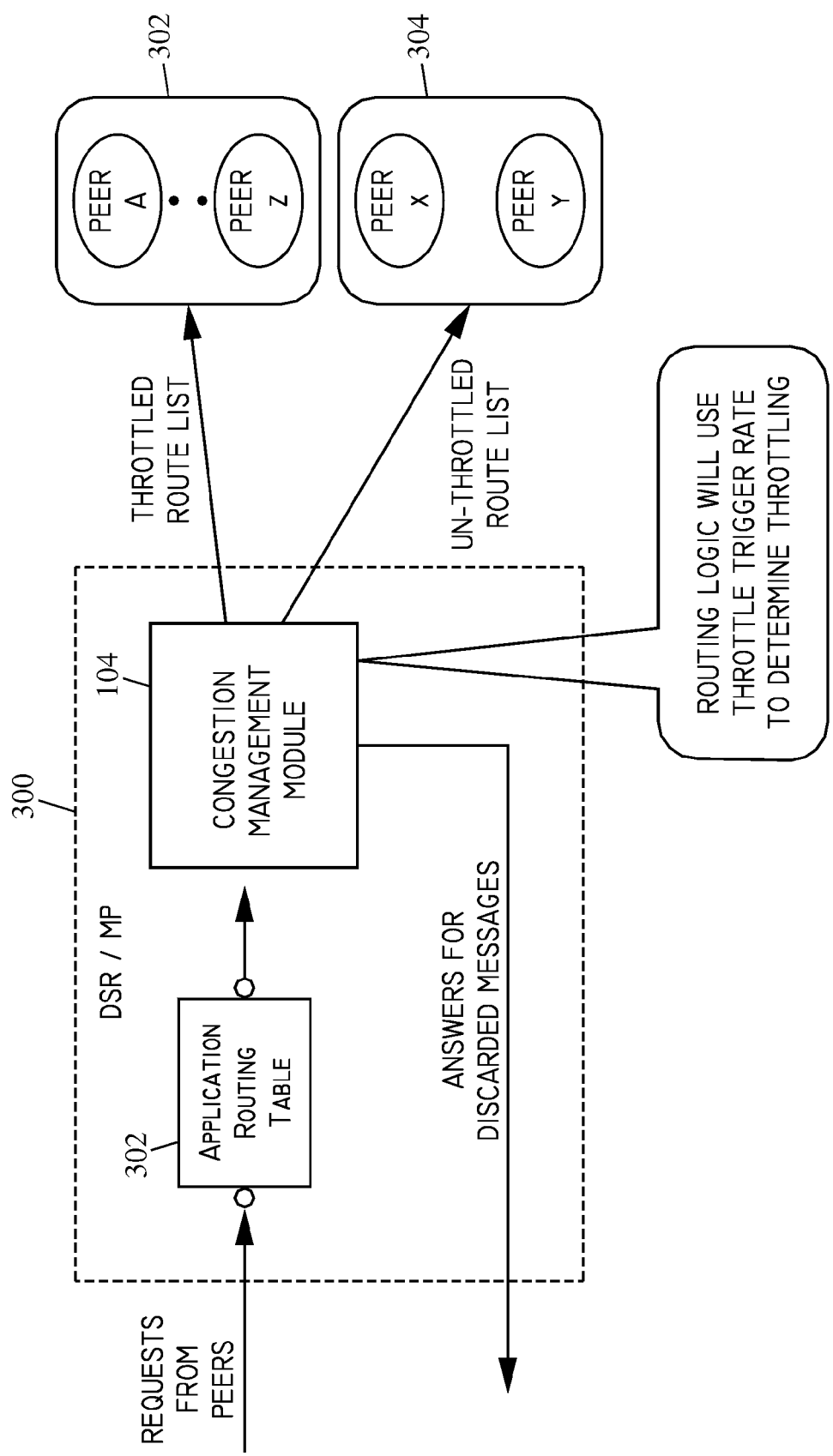
FIG. 3 is a diagram illustrating Diameter message congestion management according to another embodiment of the subject matter described herein.

FIG. 3 is a diagram illustrating Diameter message congestion management according to another embodiment of the subject matter described herein. In this embodiment, CMM 104 may be located at or part of a DSR or a MP (DSR/MP) 300. CMM 104 may include routing functionality and have access to an application routing table and a PRT for determining a destination for a received Diameter message. CMM 104 may also include access to one or more PRT and/or MAM rules. A PRT rule may identify a route list (e.g., one or more destinations for a Diameter message presented in a prioritized order) and related congestion management information. For example, a PRT rule may include various Diameter message parameters or AVPs, such as a Destination-Realm AVP, a Destination-Host AVP, an Application ID, a Command-Code, an Origin-Realm AVP, an Origin-Host AVP. If a Diameter message matches the PRT, CMM 104 or another module may determine whether an associated threshold has been exceeded. If a threshold has been exceeded, one or more congestion mitigation actions may be performed or ceased.

In some embodiments, CMM 104 or another module may include functionality for allowing user configurable and/or dynamic congestion management rules (e.g., thresholds and associated congestion management actions). For example, one or more thresholds (e.g., a throttle trigger rate and a cease throttle trigger rate) may be associated with a PRT, a route list, a route group, a MP 202, or DSR 100. Each threshold may be associated with one or more congestion mitigation actions. For example, a threshold may be associated with discarding a Diameter message, discarding a Diameter Request message, generating a Diameter Answer message associated with a discarded Diameter Request message, perform preferentially routing or processing a Diameter Answer message in relation to other Diameter Answer messages, and/or routing a received Diameter message to a destination via an alternate route (e.g., a backup or less congested path).

In some embodiments, CMM 104 or another module may include functionality for marking Diameter messages for congestion management rules and/or actions and/or for marking Diameter messages for bypassing congestion management rules and/or actions. For example, as depicted in FIG. 3, a Diameter message may query an application routing table. Prior to querying the application routing table (e.g., at screening module 102) or after querying the application routing table (e.g., at CMM 104 or another module), Diameter messages may be modified or otherwise marked to indicate to CMM 104 that congestion mitigation actions should be performed.

In some embodiments, CMM 104 or another module may include functionality for preventing a threshold from being exceeded by performing one or more congestion mitigation actions. For example, a throttle trigger rate may be associated with a route list identified by a PRT rule. In this example, CMM 104 or another module may enforce the throttle trigger rate (e.g., for messages sent to peers in the route list). The rate may be maintained by discarding all or some (e.g., based on a dynamic or predetermined ratio) messages arriving above this rate. Exponentially-smoothed system wide moving-average system key performance indicator (KPI) may be used to keep messages flowing at or below an associated threshold rate.

In some embodiments, CMM 104 or another module may include functionality for determining whether a Diameter message is to be affected by congestion management rules and/or actions. For example, CMM 104 may use a white list and a black list. A white list may be used to identify Diameter messages, subscribers, tiers, or other groups that may bypass congestion management rules and/or actions. A black list may be used to identify Diameter messages, subscribers, tiers, or other groups that may be affected by congestion management rules and/or actions.

FIG. 4 is a diagram illustrating exemplary routing and congestion management data according to an embodiment of the subject matter described herein. In some embodiments, the exemplary data may be stored in DSR 100, MP 202, or modules (e.g., rules storage 208, 210, or 216) therein.

Table 400 may represent a data structure containing routing information and associated MPS thresholds. Table 400 may include information stored in multiple fields or columns, such as an origination host field, an origination realm field, a destination host field, a destination realm field, an application identifier field, a direction (e.g., ingress or egress) field, an MPS threshold field, and a congestion mitigation action field. Using the exemplary data of table 400, DSR 100 or a module therein may determine whether to apply a congestion mitigation action based on one or more characteristics of a Diameter message. For example, if a Diameter message has characteristics matching the first six fields of row 1 in Table 400 and if a threshold of 500 MPS has been exceeded, then a post-threshold action identified as "Apply Mediation Rule X" may occur.

Table 402 may represent a data structure containing congestion mitigation rules. Table 402 may include information stored in multiple fields or columns, such as a post-threshold mediation rule identifier field, a rule description field, a parameter or AVP identifier field, a parameter or AVP value field, and a congestion mitigation action field. Using the exemplary data of table 402, DSR 100 or a module therein may determine which congestion mitigation action is to be performed. For example, "Mediation Rule X" is a parameter specific discrimination rule for discarding a Diameter request message and sending a Diameter answer message to the Diameter request message originator.

Figure 5:
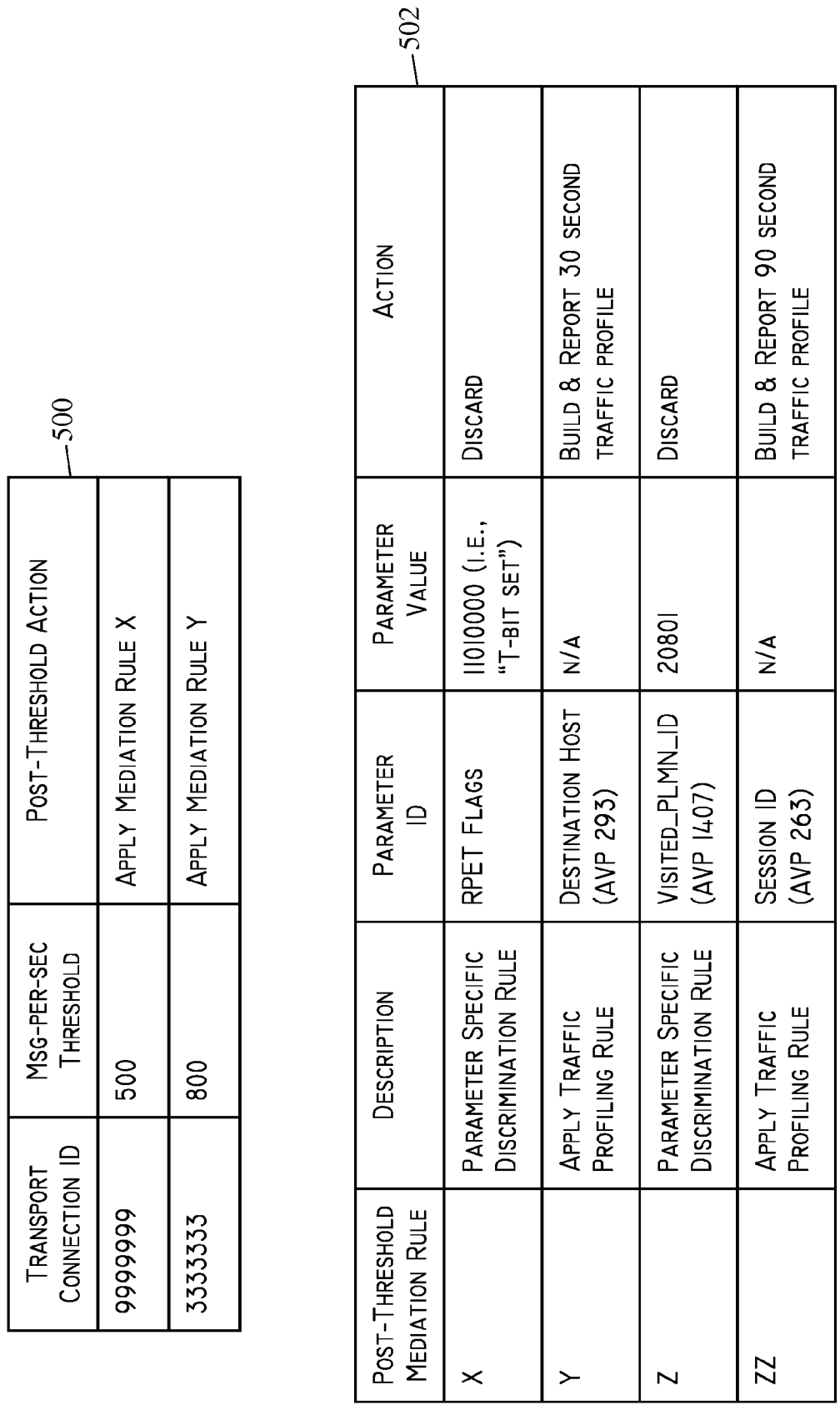
FIG. 5 is a diagram illustrating exemplary connection and congestion management data according to an embodiment of subject matter described herein.

FIG. 5 is a diagram illustrating exemplary connection and congestion management data according to an embodiment of the subject matter described herein. In some embodiments, the exemplary data may be stored in DSR 100, MP 202, or modules (e.g., rule storage 208, 210, or 216) therein.

As depicted, table 500 may represent a data structure containing peer connection information and associated MPS thresholds. Table 500 may include information stored in multiple fields or columns, such as a transport connection identifier field, an MPS threshold field, and a post-threshold action field. Using the exemplary data of table 500, DSR 100 or a module therein may determine whether to apply a congestion mitigation action based on the transport connection identifier. For example, if a Diameter message is part of a session associated with transport identifier "3333333" and if a threshold of 800 MPS has been exceeded, then a post-threshold action identified as "Apply Mediation Rule Y" may occur.

Table 502 may represent a data structure containing congestion mitigation rules. Table 502 may include information stored in multiple fields or columns, such as a post-threshold mediation rule identifier field, a rule description field, a parameter or AVP identifier field, a parameter or AVP value field, and a congestion mitigation action field. Using the exemplary data of table 502, DSR 100 or a module therein may determine which congestion mitigation action is to be performed. For example, "Mediation Rule Y" is an apply traffic profiling rule for building and reporting a thirty second traffic profile.

Figure 6:
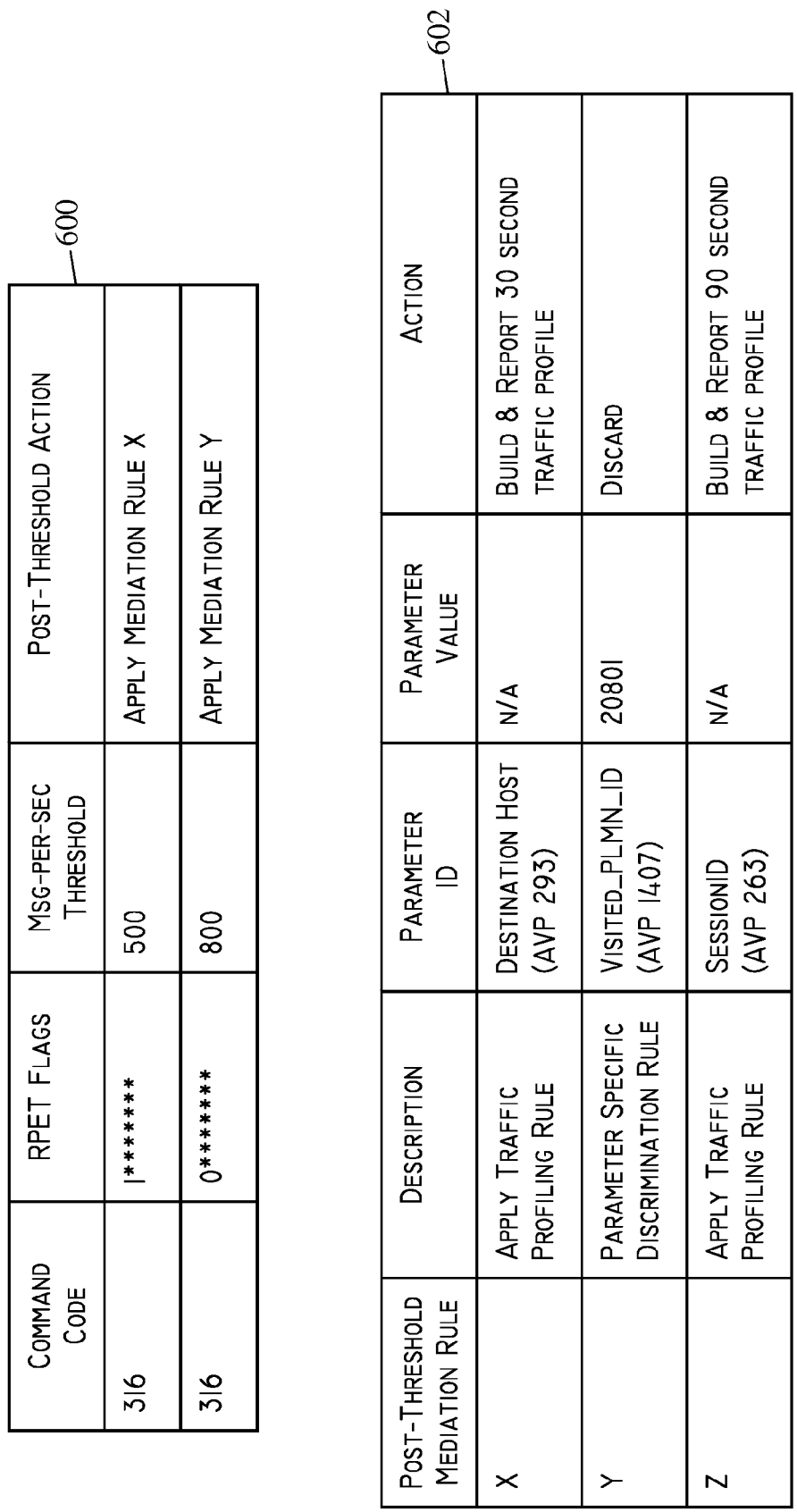
FIG. 6 is a diagram illustrating exemplary message and congestion management data according to an embodiment of subject matter described herein.

FIG. 6 is a diagram illustrating exemplary message and congestion management data according to an embodiment of the subject matter described herein. In some embodiments, the exemplary data may be stored in DSR 100, MP 202, or modules (e.g., rules storage 208, 210, or 216) therein.

As depicted, table 600 may represent a data structure containing message attribute information and associated MPS thresholds. Table 600 may include information stored in multiple fields or columns, such as a transport connection identifier field, an MPS threshold field, and a post-threshold action field. Using the exemplary data of table 600, DSR 100 or a module therein may determine whether to apply a congestion mitigation action based on a command code and flags associated with a Diameter message. For example, if a Diameter message includes command code "316" and a request (R) flag is "0" and if a threshold of 800 MPS has been exceeded, then a post-threshold action identified as "Apply Mediation Rule Y" may occur.

Table 602 may represent a data structure containing congestion mitigation rules. Table 602 may include information stored in multiple fields or columns, such as a post-threshold mediation rule identifier field, a rule description field, a parameter or AVP identifier field, a parameter or AVP value field, and a congestion mitigation action field. Using the exemplary data of table 602, DSR 100 or a module therein may determine which congestion mitigation action is to be performed. For example, "Mediation Rule Y" may be a parameter specific discrimination rule for changing a Visited-PLMN-ID AVP and discarding the Diameter message.

Figure 7:
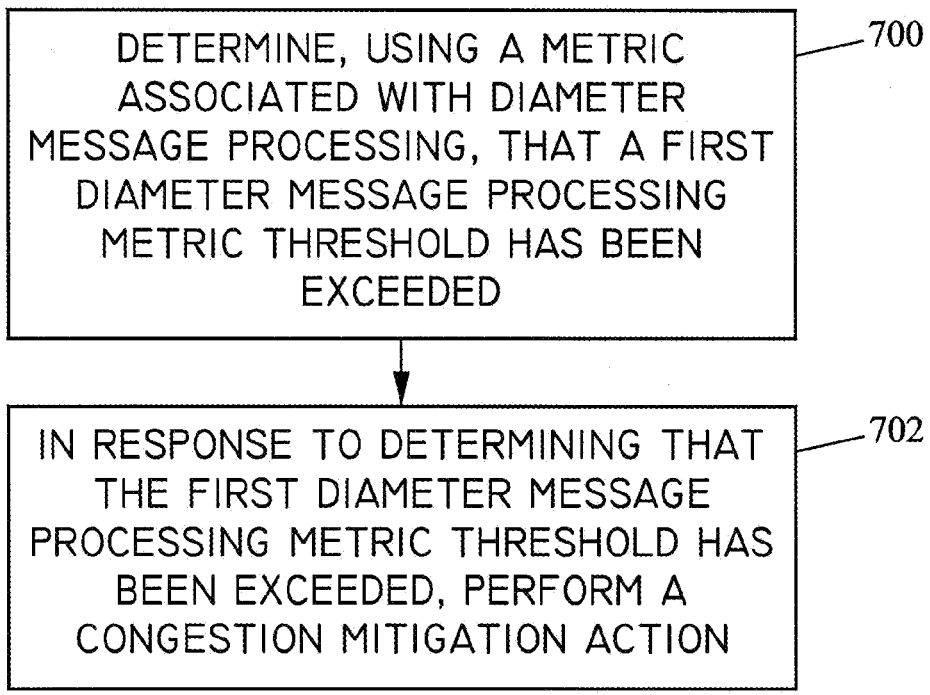
FIG. 7 is a flow chart illustrating exemplary steps for congestion management in a Diameter signaling network according to an embodiment of the subject matter described herein.

FIG. 7 is a flow chart illustrating exemplary steps for providing congestion management according to an embodiment of the subject matter described herein. In some embodiments, one or more exemplary steps described herein may be performed at or performed by a DSR 100 or MP 202.

Referring to the embodiment illustrated in FIG. 7, at step 700, it may be determined, using a metric associated with Diameter message processing, that a first Diameter message processing metric threshold has been exceeded. For example, DSR 100 or a module therein may be configured to monitor an ingress rate (MPS) of new registration request messages to HSS 108. DSR 100 may also be aware that the metric has an associated threshold of 1,000 MPS. In this example, DSR 100 may monitor received Diameter messages and determined that the ingress rate of new registration request messages to HSS 108 is currently 1,200 MPS.

At step 702, a congestion mitigation action may be performed in response to determining that the first Diameter message processing metric threshold has been exceeded. Continuing the example stated above, in response to the ingress rate of new registration request messages to HSS 108 being 1,200 MPS, DSR 100 or a module therein may throttle new registration request messages sent to HSS 108, such as by discarding 30% of new registration requests and, optionally, sending an answer message (e.g., a user configurable or application specific Diameter Answer message) to originators of the discarded request messages. In this example, the other 70% of registration request messages may be routed to HSS 108 without modification, detour, or other congestion mitigation effects.

In some embodiments, DSR 100 or a module therein may determine, using the metric associated with Diameter message processing, that a second Diameter message processing metric threshold has been exceeded. In response to determining that the second Diameter message processing metric threshold has been exceeded, DSR 100 or a module therein may cease a congestion mitigation action. Continuing with the example stated above, a second metric threshold of 500 MPS may be associated with the ingress rate of new registration request messages to HSS. If the second metric threshold is exceeded (e.g., if the current ingress rate of new registration request messages to HSS goes below 500 MPS), DSR 100 or a module therein may stop throttling new registration request messages to HSS 108.

In some embodiments, performing a congestion mitigation action may include analyzing subsequent Diameter messages to determine one or more common attributes of the subsequent Diameter messages and in response to determining the one or more common attributes of the subsequent Diameter messages, perform a second congestion mitigation action for one or more Diameter messages having the one or more common attributes.

In some embodiments, the metric associated with Diameter message processing includes an ingress rate of Diameter signaling messages to the Diameter routing node, an egress rate of Diameter signaling messages from the Diameter routing node, a message processing queue depth associated with the Diameter routing node, a processor utilization metric associated with the Diameter routing node, a failed transaction volume metric associated with the Diameter routing node, or a rate of communication of Diameter messages.

In some embodiments, performing a congestion mitigation action includes discarding a Diameter message, discarding a Diameter Request message, generating a Diameter Answer message associated with a discarded Diameter Request message, preferentially routing or processing a Diameter Answer message in relation to other Diameter Answer messages, or routing a received Diameter message to a destination via an alternate route.

In some embodiments, the Diameter message is discarded based on predefined Diameter message criteria, such as an AVP value.

In some embodiments, performing a congestion mitigation action includes performing the congestion mitigation action using a white list or black list, wherein a Diameter message associated with the white list is not throttled and wherein a Diameter message associated with the black list is throttled.

It will be appreciated that the above examples are illustrative and that the functionality described herein may be implemented for use with or applicable for various signaling messages, various signaling interfaces and various signaling nodes, including messages, interfaces, and nodes not explicitly described above, without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for managing congestion in a Diameter signaling network, the method comprising:
   at a Diameter routing node:
      processing and routing a plurality of received Diameter messages;
      determining, using a metric associated with Diameter message processing, that a first Diameter message processing metric threshold has been exceeded;
      in response to determining that the first Diameter message processing metric threshold has been exceeded, performing a first congestion mitigation action, wherein performing the first congestion mitigation action includes:
         analyzing subsequent Diameter messages to determine one or more common attributes of the subsequent Diameter messages, wherein analyzing the subsequent Diameter messages to determine the one or more common attributes of the subsequent Diameter messages includes determining that the subsequent Diameter messages include a same value for one or more Diameter attribute-values pairs (AVPs);
         in response to determining the one or more common attributes of the subsequent Diameter messages, performing a second congestion mitigation action for Diameter messages having the one or more common attributes, wherein the second congestion mitigation action mitigates congestion associated with the Diameter messages having the one or more common attributes by discarding at least some of the Diameter messages having the one or more common attributes and transmitting messages to originating nodes of the discarded messages;
         determining whether the metric associated with Diameter message processing has fallen below a second Diameter message processing metric threshold, wherein the second Diameter message processing metric threshold has a different value than the first Diameter message processing metric threshold; and
         in response to determining that the metric associated with Diameter message processing has fallen below the second Diameter message processing metric threshold, ceasing the second congestion mitigation action.

2. The method of claim 1 wherein the metric associated with Diameter message processing includes an ingress rate of Diameter signaling messages to the Diameter routing node, an egress rate of Diameter signaling messages from the Diameter routing node, a message processing queue depth associated with the Diameter routing node, a processor utilization metric associated with the Diameter routing node, a failed transaction volume metric associated with the Diameter routing node, or a rate of communication of Diameter messages.

3. The method of claim 1 wherein discarding at least some of the Diameter messages having the one or more common attributes includes discarding Diameter Request messages having the one or more common attributes, wherein sending messages to the originators of the discarded messages includes sending Diameter Answer messages associated with the discarded Diameter Request messages.

4. The method of claim 1 wherein performing the second congestion mitigation action includes performing the second congestion mitigation action using a white list or black list.

5. The method of claim 1 wherein the Diameter routing node comprises a Diameter signaling router (DSR).

6. The method of claim 5 wherein discarding at least some of the Diameter messages includes discarding the messages based on predefined Diameter message criteria.

7. The method of claim 6 wherein the predefined Diameter message criteria include a Diameter AVP value.

8. A system for managing congestion in a Diameter signaling network, the system comprising:
   a Diameter signaling node, the Diameter signaling node comprising:
      at least one processor; and
      at least one memory, wherein the at least one processor is configured to, by executing instructions stored in the at least one memory:
         process and route a plurality of Diameter messages;
         determine, using a metric associated with Diameter message processing, that a first Diameter message processing metric threshold has been exceeded;
         perform a first congestion mitigation action in response to determining that the first Diameter message processing metric threshold has been exceeded, wherein performing the first congestion mitigation includes analyzing subsequent Diameter messages to determine one or more common attributes of the subsequent Diameter messages, wherein analyzing the subsequent Diameter messages to determine the one or more common attributes of the subsequent Diameter messages includes determining that the subsequent Diameter messages include a same value for one or more Diameter attribute-values pairs (AVPs), and in response to determining the one or more common attributes of the subsequent Diameter messages, performing a second congestion mitigation action for Diameter messages having the one or more common attributes, wherein the second congestion mitigation action mitigates congestion associated with the Diameter messages having the one or more common attributes by discarding at least some of the Diameter messages having the one or more common attributes and transmitting messages to originating nodes of the discarded messages;
         determine whether the metric associated with Diameter message processing has fallen below a second Diameter message processing metric threshold, wherein the second Diameter message processing metric threshold has a different value than the first Diameter message processing metric threshold; and
         in response to determining that the metric associated with Diameter message processing has fallen below the second Diameter message processing metric threshold, cease the second congestion mitigation action.

9. The system of claim 8 wherein the metric associated with Diameter message processing includes an ingress rate of Diameter signaling messages to the Diameter routing node, an egress rate of Diameter signaling messages from the Diameter routing node, a message processing queue depth associated with the Diameter routing node, a processor utilization metric associated with the Diameter routing node, a failed transaction volume metric associated with the Diameter routing node, or a rate of communication of Diameter messages.

10. The system of claim 8 wherein discarding at least some of the Diameter messages having the one or more common attributes includes discarding Diameter Request messages having the one or more common attributes, wherein sending messages to the originators of the discarded messages includes sending Diameter Answer messages associated with the discarded Diameter Request messages.

11. The system of claim 10 wherein discarding at least some of the Diameter messages includes discarding the messages based on predefined Diameter message criteria.

12. The system of claim 11 wherein the predefined Diameter message criteria include a Diameter AVP value.

13. The system of claim 8 wherein the congestion management module is configured to perform the second congestion mitigation action using a white list or black list.

14. The system of claim 8 wherein the Diameter routing node comprises a Diameter signaling router (DSR).

15. The system of claim 14 wherein the at least one processor includes a plurality of message processors for routing Diameter signaling messages, wherein the determining, using the metric associated with Diameter message processing, that a first Diameter message processing metric threshold has been exceeded is implemented on each of the message processors.

16. The system of claim 15 wherein first and second congestion mitigation actions are implemented on each of the message processors.

17. A non-transitory computer readable medium having stored thereon executable instructions that when executed by the processor of a computer control the computer to perform steps comprising:

at a Diameter routing node:
processing and routing a plurality of received Diameter messages;
determining, using a metric associated with Diameter message processing, that a first Diameter message processing metric threshold has been exceeded;
in response to determining that the first Diameter message processing metric threshold has been exceeded, performing a first congestion mitigation action, wherein performing the first congestion mitigation action includes:
analyzing subsequent Diameter messages to determine one or more common attributes of the subsequent Diameter messages, wherein analyzing the subsequent Diameter messages to determine the one or more common attributes of the subsequent Diameter messages includes determining that the subsequent Diameter messages include a same value for one or more Diameter attribute-values pairs (AVPs);
in response to determining the one or more common attributes of the subsequent Diameter messages, performing a second congestion mitigation action for Diameter messages having the one or more common attributes, wherein the second congestion mitigation action mitigates congestion associated with the Diameter messages having the one or more common attributes by discarding at least some of the Diameter messages having the one or more common attributes and transmitting messages to originating nodes of the discarded messages;
determining whether the metric associated with Diameter message processing has fallen below a second Diameter message processing metric threshold, wherein the second Diameter message processing metric threshold has a different value than the first Diameter message processing metric threshold; and
in response to determining that the metric associated with Diameter message processing has fallen below the second Diameter message processing metric threshold, ceasing the second congestion mitigation action.

* * * * *